L. WEIL.
TRANSPLANTING RECEPTACLE.
APPLICATION FILED JUNE 14, 1920.

1,380,327.

Patented May 31, 1921.

WITNESSES

INVENTOR
LIONEL WEIL
BY
ATTORNEYS

UNITED STATES PATENT OFFICE.

LIONEL WEIL, OF GOLDSBORO, NORTH CAROLINA.

TRANSPLANTING-RECEPTACLE.

1,380,327.

Specification of Letters Patent. Patented May 31, 1921.

Application filed June 14, 1920. Serial No. 388,820.

*To all whom it may concern:*

Be it known that I, LIONEL WEIL, a citizen of the United States, and resident of Goldsboro, in the county of Wayne and State of North Carolina, have invented a new and Improved Transplanting Receptacle, of which the following is a full, clear, and exact description.

In connection with the transplanting of shrubs, and flowers, and more particularly trees, it is well appreciated that various types of vegetation are far more delicate than other species.

With this in view, it has been necessary to exercise great care in transplanting and handling this type of vegetation, in that the same would not adapt itself to its new environment subsequent to having been transplanted.

With this in mind, it has been customary to form a trench around the plant to be transplanted, and to under-cut the roots of the same so that a compact ball is left around the base of the tree or plant, which ball is composed of the main and major portion of the minor roots, together with the earth through which they penetrate.

This ball or lump of dirt has heretofore been inclosed in sacking, and in this condition the tree has been shipped to the point to which it is again to be planted.

While this method may prove entirely satisfactory with regard to various types of vegetation, by far the greater part of more delicate vegetation, together with a large proportion of evergreens die subsequent to being transplanted. This is to be attributed to the fact that the sacking inclosing the root and earth ball forms a more or less flexible container, and the jars incident to the transplanting quickly cause the earth around the vital roots to become loosened therefrom, which, as aforestated, results in the declining of the plant or tree.

With this in mind, I have constructed a transplanting receptacle which may be put to this use, and by means of which all types of plants, and more particularly trees of a less heavy nature may be subject to transplanting without being greatly endangered.

Reference is had to the attached sheet of drawings as illustrating one practical embodiment of my invention, and in which drawings, Figure 1 is an elevational view of the receptacle in use.

Figure 1:
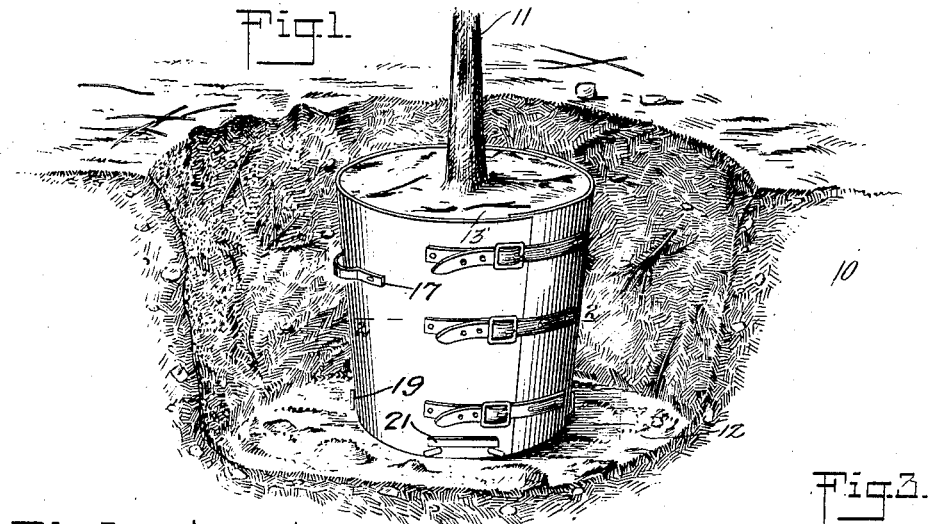
Figure 2:
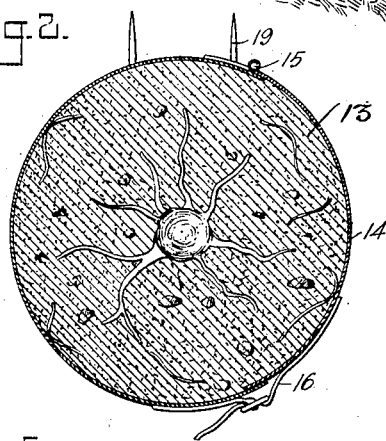
Fig. 2 is a sectional plan view taken along the lines 2—2 of Fig. 1.

In these views the reference numeral 10 indicates the ground in which a plant 11 grows. In the usual manner, a trench 12 of preferably annular construction is dug in the customary manner, so that a compact lump or ball of roots and earth 13 is left directly around the plant.

Now with a view of constructing a receptacle embodying the necessary qualifications, I provide a pair of conveniently semi-circular side walls, which, as has been illustrated, are preferably of less width at their lower than at their upper edges; these side walls being hingedly secured together as at 15 so that a receptacle of tapering construction is provided. With a view of providing means which will permit the opposite side edges of the side wall to be drawn together and held in proper position, as in Fig. 1, any suitable means such as adjustable strips 16 may be utilized, and a pair of handles 17 may be provided whereby the receptacle may be handled with greater facility.

Figure 5:
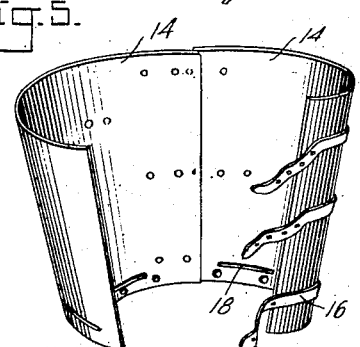
Fig. 5 is an elevational view of the same in open position, with certain of its parts eliminated.
Figure 4:
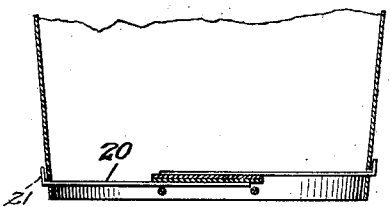
Fig. 4 is a sectional view of the base portion thereof.

It is now to be appreciated that the side walls 14 are swung open, as has been illustrated in Fig. 5 so that the same may be brought to encircle the root and earth ball 13 subsequent to which the straps or other securing means 16 are tightened to retain and firmly press the earth and roots. In this connection it is to be noted that by virtue of the tapered construction of the receptacle, that the earth forming part of the ball 13 will be prevented, to a great extent, from moving downwardly.

Now to provide means which will serve to relieve the side walls of strain by assisting in supporting the weight of the plant 11 and ball 13, I conveniently form slots 18 through the body of the side walls 14, and adjacent the lower edges thereof; these slots being preferably formed at an angle of 90° with respect to one another for a purpose hereinafter more fully specified.

Figure 3:
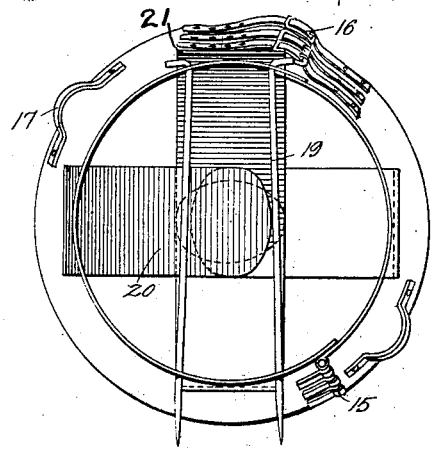
Fig. 3 is a bottom view of the receptacle.

Considering now that the side walls of the receptacle are in the position illustrated in Fig. 1, I project a pair of bars 19 through the openings in the side walls so that the same extend diametrically through the lower portion of the clod or ball 13. Slides preferably including a flat bottom portion 20 and a bead 21 are projected one through each of the slots 18, it being noted that the underface of the slides in this position will bear against the upper surface of the bars 19 and be supported there by their inner ends, as has been clearly shown in Fig. 3, overlapping one another and thus forming a more rigid type of support.

The receptacle may now be grasped by the handle 17 and removed from the trench 12 and transported to the point at which the plant 11 is to be replanted, and it will be understood that by virtue of the construction of my improved type of receptacle, but a minimum of danger of a dislodgment of the delicate roots and earth surrounding them will exist, by reason of the fact that the root and earth ball 13 is efficiently supported and retained upon all sides.

It will further be understood that numerous modifications of structure might readily be resorted to, and that the side walls 14 and slides associated therewith, although preferably formed of sheet metal might conveniently be made of some material, which although presenting sufficiently rigid qualities, will be subject to rapid decay, and if this type of material were utilized it would be obvious that the entire receptacle might be inserted into an excavation at a point at which the plant was to be replanted in the soil, and the receptacle left in this position, whereby danger of dislodgment of the earth around the roots and a severing of the more delicate roots due to the receptacle being opened would be prevented.

What I claim is:—

1. A transplanting receptacle, including a pair of side walls hingedly secured together, and means associated with said side walls adjacent their lower edges for supporting substances within said receptacle, and means for bracing said supporting means.

2. A transplanting receptacle, including a plurality of side walls hingedly secured together, said side walls being formed with slots adjacent their lower edges, slides adapted to have their body portions projected through said slots, and means positioned below said slides for supporting the same.

3. A transplanting receptacle, including a plurality of side walls hingedly secured together, said side walls being formed with slots adjacent their lower edges, slides adapted to have their body portions projected through said slots, the inner ends of said slides overlapping one another, and means positioned below said slides for supporting the same.

4. A transplanting receptacle, including a plurality of side walls hingedly secured together, said side walls being formed with slots adjacent their lower edges, slides adapted to have their body portions projected through said slots, and a pair of bars extending through openings in the side walls and positioned below said slots, said bars being adapted to bear against the under faces of said slides whereby to support the same.

5. A transplanting receptacle, including a pair of semi-circular side walls hingedly secured together adjacent one of their side edges, means for retaining the opposite side edges of said side walls together, and means associated with said side walls for forming a support extending adjacent the lower edges of the same for retaining a substance within said receptacle.

LIONEL WEIL